April 30, 1929.  A. L. GRIFFIN  1,710,819
HEADLIGHT AND OPERATING MEANS
Filed Dec. 6, 1927
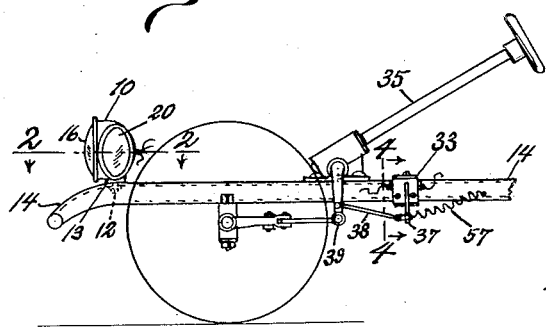
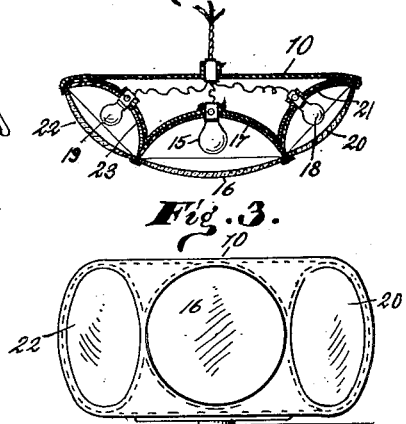
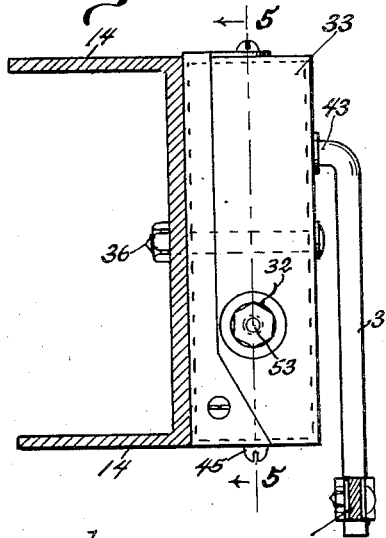
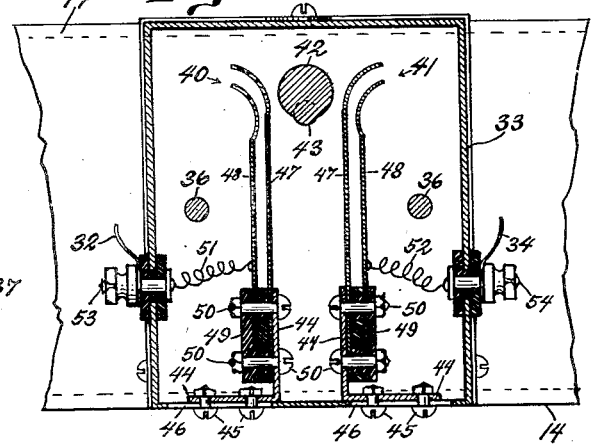
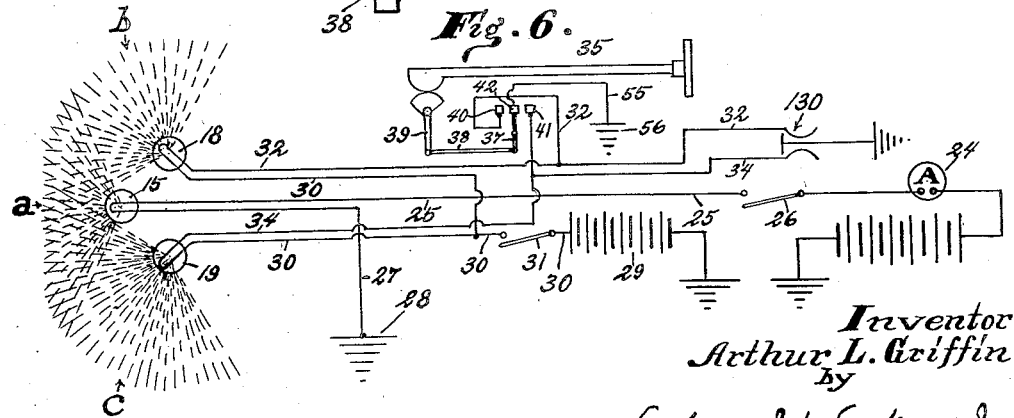
Inventor.
Arthur L. Griffin.
by
Lockwood & Lockwood,
His Attorneys.

Patented Apr. 30, 1929.

1,710,819

UNITED STATES PATENT OFFICE.

ARTHUR L. GRIFFIN, OF LOS ANGELES, CALIFORNIA, ASSIGNOR OF ONE-HALF TO EDWARD E. JOHNSON, OF LOS ANGELES, CALIFORNIA.

HEADLIGHT AND OPERATING MEANS.

Application filed December 6, 1927. Serial No. 238,093.

This invention relates to means for lighting the lamps for illuminating the road in front and toward the sides of automobiles when necessary and an object is to provide a headlight with a center lamp arranged to direct light in front of the vehicle and side lamps associated therewith to direct light to the right or left side of the vehicle with means connected thereto for lighting said lamps separate or altogether as may be desired.

Another object of the invention is to provide automatic means for lighting the side lamps independently of one another when the automobile is turned from a straight course. That is, when the steering means is actuated to turn the automobile toward the right the right side lamp will be automatically lighted and when it is turned toward the left the left side lamp will be automatically lighted, it being understood that both side lamps are unlighted until the steering mechanism is actuated to turn the automobile.

Features of the invention are shown in the construction, combination and arrangement of parts whereby a headlight with means for controlling it is provided that is neat and pleasing in appearance, durable and of great usefulness in directing light in front of the car and into sharp turns in the road to the right or left, or simultaneously direct light in front and toward each side of the car.

Other objects, advantages and features of invention may appear from the accompanying drawing, the subjoined detailed description and the appended claims.

The accompanying drawing illustrates the invention.

Figure 1 is a semi-diagrammatic side view of a headlight constructed in accordance with this invention showing it in use on an automobile and also showing the operating means connected to the frame and steering arm of the automobile; Fig. 2 is an enlarged central section on line 2—2, Fig. 1, showing the arrangement of the lamps; Fig. 3 is a front view of the headlight showing a fragmental section of the cross bar of an automobile frame to which it is attached; Fig. 4 is an enlarged section on line 4—4, Fig. 1, showing the grounding switch attached to the automobile frame; Fig. 5 is a central vertical section through the switch showing a detail of the means for lighting the side lamps; Fig. 6 is a diagrammatic view of the headlight, wiring and operating means.

The headlight is provided with a housing 10 that can be secured by a bolt 11 and nut 12 to a cross bar 13 of an automobile frame 14 as fragmentally and semi-diagrammatically indicated in Figs. 1 and 3.

It is understood that the headlight can be arranged in any suitable place on an automobile to direct light toward its front and sides.

A center lamp 15 is arranged in the housing 10 so it is adapted to direct light in front of the vehicle and it is provided with a front convex lens 16 and concave reflector 17 that can be of usual form and construction and secured in place in a usual way.

Right and left hand side lamps 18, 19 are also mounted in the housing 10 and provided with the respective lenses and deflectors 20, 21 and 22, 23, that are slightly smaller but similar in form to the lens and reflector of the center lamp; and preferably the side lamps are arranged at an angle of forty-five degrees to the center lamp, it being understood that the angle can be more or less if so desired.

In other words the lamps are arranged so that when the center and a side lamp are lighted an arc of fully a hundred and eighty degrees or more will be brightly illuminated, and this illumination extends entirely across the front and side of the automobile when all the lamps are lit; or the lighting of the side lamps can be arranged so that a turn to right or left is illuminated when the steering mechanism of the automobile is actuated to consummate a turn either in a curve in the road or to reverse the direction of the car.

The center lamp 15 is lighted in the usual way. That is, it is connected to the ammeter 24 by a wire 25 in which there is a switch 26 which when closed causes current to pass through the lamp and ground on the automobile frame illustrated in Fig. 6 by wire 27 and ground 28.

The side lamps can also be connected to the ammeter if so desired, but for the purpose of illustration they are shown connected to a battery 29 by the split wire 30 in which a switch 31 is interposed.

The right hand lamp 18 is connected by a split wire 32 with one side of the grounding switch 33 and also the switch 130 and another split wire 34 connects the left hand lamp 19 with the other side of the switch 33 and also the switch 130 so that when the steering post 35 is actuated to turn the automobile either to the right or left the grounding switch 33 will be actuated to light one or the other of the side lamps according to the direction in which the automobile is turned.

The grounding switch 33 is secured by bolts 36 to the automobile frame 14 adjacent the steering post 35 so that the lever 37 of the switch can be connected by a short link 38 to the steering crank arm 39 so that when the latter is operated to turn the automobile the switch arm will also be actuated to close either the right or left hand terminals 40, 41 in the switch casing 33.

The terminals 40, 41 are constructed substantially alike except that they are arranged on opposite sides of a cam 42 that is integral with a shaft 43 connected to the lever 37.

Each terminal comprises an angle plate 44 that is adjustably secured by screws 45 that pass through slots 46 in the bottom of the casing, so that the plates with their respective terminals can be adjusted toward or from one another to thereby arrange the terminals in a right position relative to the cam 42 to be engaged by it to light the side lamps when desired. In other words the closer the contacts 47 are to the cam 42 the quicker will the side lamps be lit when the car is turned.

Each angle plate carries a sheet metal spring contact 47 that is in circuit with it; and also another sheet metal spring contact 48 that is insulated from the contact 47 by blocks 49 all of which are connected to the angle plate by screw bolts 50.

The contacts 48 of the respective terminals 40, 41 are connected by wires 51, 52 with terminal posts 53, 54 insulated through the end walls of the casing 33 to which the respective wires 32, 34 are connected. Preferably the ends of the wires 51, 52 are secured to their respective terminal posts and spring contacts as by soldering.

The terminals 40, 41 have their spring contacts so arranged that when the cam 42 is actuated it will engage one or the other contacts 47 with its associated contact 48 to close the circuits through one or the other of the side lamps and ground the current in the frame of the automobile which grounding is illustrated in Fig. 6 by the wire 55 and ground 56.

If desired a spring 57 can be connected to the frame 14 and lever 37 so that a flexible link 38 can be used to connect rocker arm 37 to the steering arm if so desired, see Fig. 1.

In operation the lamp 15 of the headlight is lighted by closing the switch 26, and when lighted it illuminates the space in front of the automobile as does an ordinary headlight; the side lamps can remain unlighted until the automobile is to be turned from a straight course.

When such a turn is to be consummated either to the right or left and the switch 31 is closed one or the other of the side lamps will be lighted by the co-action of the steering post and the grounding switch. That is as the steering post is actuated to turn the automobile it will also through its connection to the switch actuate the cam 42 to close one or the other of the terminals 40, 41 to ground the current through either one or the other of the side lamps and thereby illuminate the direction in which the automobile is turning.

In other words if the crank arm 39 is actuated to turn the automobile to the right the right hand lamp 18 will be automatically lighted; and if actuated to turn the automobile to the left the lamp 19 will be automatically lighted.

By the foregoing construction, arrangement and co-action of parts the center lamp 15 can be lighted to provide an illuminated field $a$ in front of the automobile when necessary; and the side lamps can be automatically lighted when the automobile is turning to add the illuminated fields $b$ or $c$ to the lighted area. That is, when a right turn is made the light field $b$ will be added to the field $a$ and the field $c$ left unilluminated, and when a left turn is made the light of field $c$ will be added to the field $a$ and the field $b$ left unilluminated as best illustrated in Fig. 6.

In other words the center lamp can be illuminated continually when lighting is necessary; and the side lamps lighted only when the automobile is turned from a straight course or all of the lamps can be lighted continually when light is necessary; except when the switches 3 and 130 are closed.

That is, when all of the switches 26, 31 and 130 are closed all the lamps will be lit to illuminate the space in advance of the automobile and to its sides, as the closing of the switch 130 will short circuit the current so it will not pass through the grounding switch 33.

What I claim:

1. In a headlight for automobiles, the combination of a housing having a center lamp therein arranged to direct light in advance of an automobile, right and left hand lamps in said housing that are arranged to direct light to the sides of the automobile, means for lighting the center lamp independently of the side lamps, a casing adapted to be attached to the frame of an automobile, adjustable terminals in said casing that are arranged in a circuit with said side lamps, a cam arranged between said terminals, a shaft on which said cam is mounted, a lever for rotatating said cam to engage it with one or the other of said terminals, and a connection between said lever and the steering crank arm of the automobile whereby one or the other of said side lamps are lighted when the automobile is turned from a straight course.

2. In a headlight for automobiles, the combination of a housing, a center light in said housing arranged to direct light in front of the automobile, right and left hand side lamps arranged on opposite sides of said center lamp to direct light to the sides of the automobile, means for lighting said center lamp independently of said side lamps, a casing adapted to be secured to the automobile, terminals slidably mounted in said casing that are adjustable toward or from one another and are in circuit with said side lamps, a cam between said terminals, a shaft on which said cam is mounted, a lever for rotating said cam to engage it with one or the other of said terminals to ground the circuit through one or the other of said side lamps, a steering crank arm for turning the automobile, and a link connecting said lever to said crank arm whereby the actuation of said crank arm to turn the automobile to the right or left will close the circuit and light one or the other of the right or left hand side lamps.

3. In a headlight the combination of a housing having a center and side lamps therein, means for lighting the center lamp independently of the side lamps, a casing adapted to be attached to the frame of an automobile, a cam in said casing, terminals slidably adjustable toward or from one another and arranged on opposite sides of said cam and in circuit with said side lamps, and means connected with the steering post of an automobile for actuating said cam to engage one or the other of said terminals to ground the current in the circuit and thereby illuminate one or the other of said side lamps and other means for lighting all of said lamps simultaneously.

In witness whereof, I have hereunto affixed my signature.

ARTHUR L. GRIFFIN.